(12) United States Patent
Beltman et al.

(10) Patent No.: US 10,737,782 B2
(45) Date of Patent: Aug. 11, 2020

(54) DRONE BASED DELIVERY SYSTEM

(71) Applicant: Intel Corporation, Santa Clara, CA (US)

(72) Inventors: Willem M. Beltman, West Linn, OR (US); Bradley Alan Jackson, Hilsboro, OR (US); David Gomez Gutierrez, Tlaquepaque (MX); Jose Parra Vilchis, Guadalajara (MX); Rafael De La Guardia Gonzalez, Guadalajara (MX); Joshua Triska, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 263 days.

(21) Appl. No.: 15/720,667

(22) Filed: Sep. 29, 2017

(65) Prior Publication Data

US 2019/0100307 A1 Apr. 4, 2019

(51) Int. Cl.
| | |
|---|---|
| *B64C 39/02* | (2006.01) |
| *B64D 1/12* | (2006.01) |
| *B64D 47/08* | (2006.01) |
| *G05D 1/00* | (2006.01) |
| *G05D 1/10* | (2006.01) |
| *G05D 1/06* | (2006.01) |
| *G06Q 10/08* | (2012.01) |
| *B60L 58/16* | (2019.01) |

(52) U.S. Cl.
CPC .............. *B64C 39/024* (2013.01); *B64D 1/12* (2013.01); *B64D 47/08* (2013.01); *G05D 1/0088* (2013.01); *G05D 1/0669* (2013.01); *G05D 1/102* (2013.01); *G05D 1/104* (2013.01); *B60L 58/16* (2019.02); *B64C 2201/108* (2013.01); *B64C 2201/128* (2013.01); *B64C 2201/146* (2013.01); *G06Q 10/083* (2013.01)

(58) Field of Classification Search
CPC . B64C 37/02; B64C 39/024; B64C 2201/146; B64C 2201/143; B64C 2201/128; B64D 1/12; B64D 47/08; G05D 1/102; G05D 1/104; G05D 1/0088; G05D 1/0669
See application file for complete search history.

(56) References Cited

U.S. PATENT DOCUMENTS

| | | | |
|---|---|---|---|
| 9,561,852 B1* | 2/2017 | Beaman | B64D 1/00 |
| 10,013,886 B2* | 7/2018 | Blomberg | G08G 5/0082 |
| 10,062,292 B2* | 8/2018 | Blomberg | B64C 39/024 |
| 2014/0032034 A1* | 1/2014 | Raptopoulos | G08G 5/0069 701/25 |
| 2016/0144734 A1* | 5/2016 | Wang | B60L 11/1822 701/17 |
| 2017/0069214 A1* | 3/2017 | Dupray | G08G 5/0021 |
| 2017/0127245 A1* | 5/2017 | Adkins | B64C 39/024 |

(Continued)

*Primary Examiner* — Mussa A Shaawat
(74) *Attorney, Agent, or Firm* — Schwegman Lundberg & Woessner, P.A.

(57) ABSTRACT

Systems and methods may include a lift drone and a carrier drone to convey a payload. The lift drone may vertically lift the payload, alone or with the carrier drone, to a transfer location. The carrier drone may receive control of the payload at the transfer location, such as by receiving physical transfer of the payload, taking over conveyance of the payload from the lift drone, or the like. The lift drone may remain coupled with the payload or the carrier drone or may decouple after transfer.

25 Claims, 9 Drawing Sheets

(56) References Cited

U.S. PATENT DOCUMENTS

| | | | |
|---|---|---|---|
| 2017/0129603 A1* | 5/2017 | Raptopoulos | B64C 39/024 |
| 2017/0259940 A1* | 9/2017 | Blomberg | B64F 1/368 |
| 2018/0053426 A1* | 2/2018 | Butler | G08G 5/0039 |
| 2018/0194469 A1* | 7/2018 | Evans | B64C 39/024 |
| 2019/0344770 A1* | 11/2019 | Cha | B60V 3/025 |

* cited by examiner

DRONE BASED DELIVERY SYSTEM

BACKGROUND

Drones are increasingly being used to carry packages, such as for delivery to homes and businesses. Challenges for package delivery often include limitations on cargo weight due to lift capability limits of a drone as well as fuel requirements. A drone based package delivery is also limited in delivery distance due to battery life of the drone. In some circumstances, a drone may be optimized for travel distance but unable to perform a vertical lift, requiring a runway instead.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
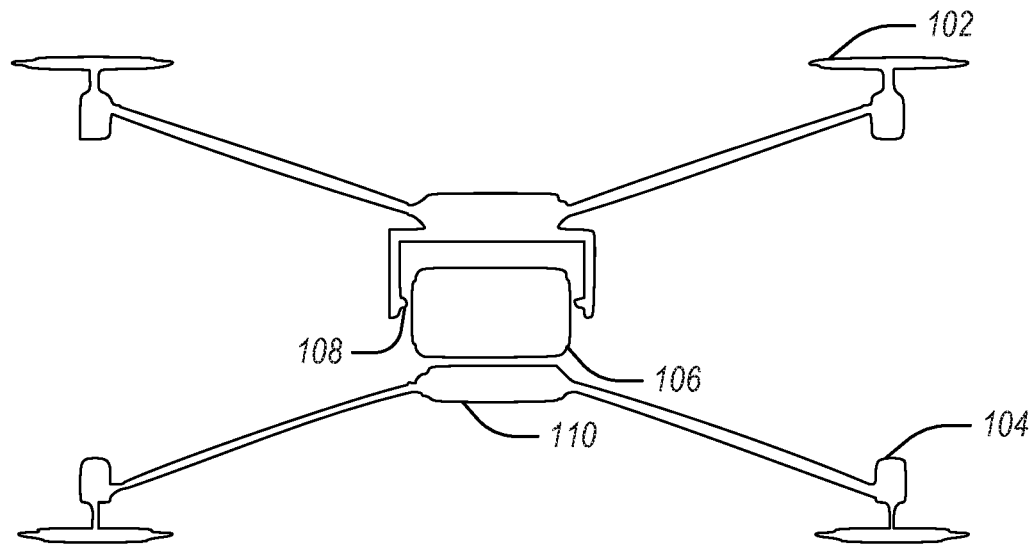
FIGS. 1-5 illustrate drone based delivery systems in accordance with some embodiments.

Systems and methods for implementing and using a drone based delivery system are described herein. The systems and methods described herein use a plurality of drones to perform payload conveyance. Having more than one drone collaborate to carry payload allows a system to optimize drones in the system, such as to increase lift capacity and extend delivery range.

In recent years delivery drones have started to find acceptance to provide service even in urban areas. Multirotor drones or hybrid fixed wing-multirotor drones are some drone types used because of their maneuverability, load-carrying capacity, and vertical takeoff capability. Almost all multi-rotor drones run on batteries and their flying time on a full charge is limited, for example to about 40 minutes with a payload weighing a couple of kilograms in some cases. One delivery company, for example estimates a 30 minute delivery time from distribution centers covering a range of 16 km with an octocopter carrying a payload of 2.3 kg. With the weight of a battery for similar drones coming in around 3 kg, the battery weighs more than the payload. In general for all types of aircraft (including drones) engines and fuel (e.g., a battery) typically account for 40% to 60% of their gross takeoff weight.

Typically, drone delivery systems rely on a single drone to lift off from a start location, convey a payload to a certain height, travel to a remote location, and land with a payload. An example aircraft may require about twice as much power for takeoff and climbing than for cruising. In an example, for a 30 minutes package delivery mission, ascent/descent accounts for approximately 20% of the total time and roughly 50% of the total energy consumed. By having a separate drone provide power for ascent/descent, delivery range may be extended by as much as 50%. In an example, the benefit may be larger when a more efficient drone designed for cruising, such as a fixed wing aircraft, is used instead of a multi-rotor drone. Fixed-wing aircraft are particularly efficient cruising at altitude but their lack of vertical takeoff and hovering capabilities are major drawbacks for their use in package delivery. Hybrid drones combining multi-rotor and fixed-wing come with a drawback of needing to carry the bulk associated with the multi-rotor system at all times the multi-rotor system is only used during takeoff and landing.

In an example, a multi-rotor drone may be used to assist another drone during takeoff. For clarity, in the following text the latter will be called the carrier drone while the former is called the lift drone even though in some examples, the same drone may perform either one of the two roles. In an example, the carrier drone may be a fixed-wing drone. In that example, having a lift drone enables a fixed-wing drone to be optimized for cruising for package delivery. In addition, a second lift drone in a delivery area may rendezvous with a carrier drone at a high altitude to receive transfer of the payload for delivery to a final destination on the ground. In an example, the receiving lift drone may transfer a second package to the carrier drone to take to a second destination or back to an original location or a home base. In another example, the receiving lift drone, for example after securing the payload, may take on the role of a carrier thereby extending the range of the drone delivery system. In yet another example, two drones may cooperate to handle a heavier payload than would be possible with only a single drone.

The systems and methods described enable separate aircraft to be optimized for the different tasks of cruising at altitude and climbing/descent. The drone systems and methods may perform one or more of the following capabilities: 1) vertical takeoff or landing; 2) efficient cruising at high altitude while carrying a payload; 3) extended fly range using in-air transfer of payload; or 4) load sharing a heavy payload between two or more drones.

FIGS. 1-5 illustrate drone based delivery systems in accordance with some embodiments. Each of the FIGS. 1-5 show details of different embodiments for using drones to deliver a payload. In an example, the drones shown in FIGS. 1-5 may be interchangeable, or may be used together, such as to extend a delivery distance.

FIG. 1 illustrates a first example drone based delivery system 100. The system 100 includes a lift drone 104 and a carrier drone 102. In an example, the lift drone 104 and the carrier drone 102 may be similar or identical types of drones. In another example, the lift drone 104 may be specialized for lift, and the carrier drone 102 may be specialized for transporting a payload 106. In an example, the lift drone 104 includes a platform 110 to support a payload 106 and the carrier drone 102 includes a latch 108 to secure the payload 106 to the carrier drone 102. The lift drone 104 may secure a payload 106 to the platform 110 and lift from an initial position to a transfer location. In an example, the initial position may be a ground based position, such as a platform or launching/landing pad of a building or ground. In an example, the transfer location may be a position above the initial position. For example, the transfer location may be vertical counter to a gravitational force from the initial position. The transfer location may have an altitude greater than the initial position. The transfer location may be a static position in space or may be a route traveled along while transferring the payload 106. For example, the lift drone 102 and the carrier drone 104 may travel together for a certain distance while transferring the payload 106.

The lift drone 104 may lift the payload 106 from the initial position to the transfer location and couple with the carrier drone 102 at the transfer location. In another example, the lift drone 104 may lift the payload 106 along with the carrier drone 102 from the initial position to the transfer location. The lift drone 104 and the carrier drone 102 may be in communication to transfer control of the payload 106. For example, one of the lift drone 104 and the carrier drone 102 may be responsible for rendezvousing with the other. One of the drones may determine a location or position or direction of travel of the other based on a communicated location, GPS data, etc. Fine tuning for coupling may be performed using a camera or a sensor, examples of which are described below with respect to FIG. 5.

To transfer the payload 106 from the lift drone 104 to the carrier drone 102 may include physically transferring the payload 106, such that the lift drone 104 does not support the payload 106 after transfer. In another example, transferring the payload 106 may include retaining physical contact between the lift drone 104 and the payload 106 or the carrier drone 102, but transferring control of the drone system 100 to the carrier drone 102. Control of the drone system 100 may include motor or engine support or control, responsibility for sending control commands to the other drone, or the entirety of lift and conveyance responsibility. For example, after transfer, the lift drone 104 may remain coupled to the payload 106 or the carrier drone 102, and may deactivate or relinquish control of one or more functions to the carrier drone 102 (e.g., engine or motor control).

In an example, the platform 110, the latch 108, or both may support the payload 106, such as at various times throughout the lift, transfer, and conveyance of the payload 106 from an initial position to a delivery location. In an example, the carrier drone 102 may include a plurality of latches, such as a pair of latches opposite each other or four latches (e.g., one on each side of a box payload). The latch 108 may be an electromechanical latch configured to retract and extend to release and secure the payload 110, respectively. The latch 108 may be controlled by a processor of the carrier drone 102.

Figure 2:
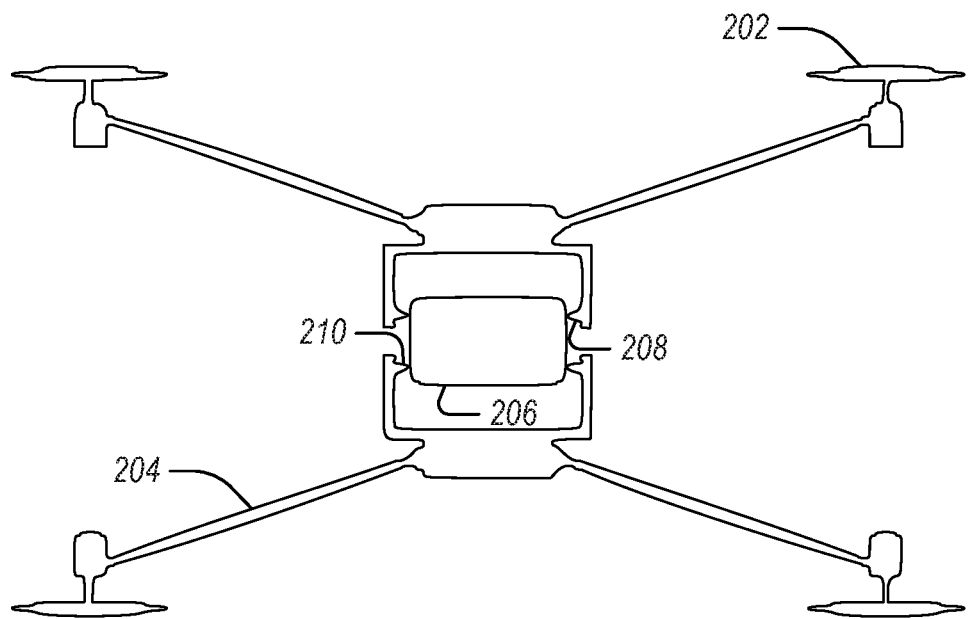

FIG. 2 illustrates a second example drone based delivery system 200. The system 200 includes a lift drone 204 and a carrier drone 202. In an example, the lift drone 204 and the carrier drone 202 may be identical or of a similar type to each other. For example, the carrier drone 202 or the lift drone 204 may be of the same type as the carrier drone 102 of FIG. 1. The carrier drone 202 may include a latch 208, similar to the latch 108 of FIG. 1. In an example, the lift drone 204 includes a latch 210. The latch 210 may be used to secure a payload 206 to the lift drone 204.

In an example, the lift drone 204 may rendezvous (e.g., at a transfer location) with the carrier drone 202 in air to perform a transfer of the payload 206. Following the rendezvous, the lift drone 204 may decouple from the payload 206 or the carrier drone 202 and return to an initial position or may continue on to another location. The carrier drone 202 may carry the payload 206 to a delivery location.

In another example, the lift drone 204 may stay coupled to the payload 206 or the carrier drone 202. The carrier drone 202 may then convey the lift drone 204 and the payload 206 to a delivery location. The carrier drone 202 or the lift drone 204 may convey the drone system 200 including the payload 206 to a landing position of the delivery location. In yet another example, after conveying the lift drone 204 and the payload 206 to the delivery location, the carrier drone 202 may decouple from the payload 206 or the lift drone 204, and the lift drone 204 may convey the payload 206 down to a landing position. The carrier drone 202 may continue to another location, stay in the air, or couple with a different lift drone to convey another payload. The carrier drone 202 may for example, make multiple payload deliveries before needing to recharge its battery. In still another example, the carrier drone 202 may descend with the payload 206 to a landing position while the lift drone 204 decouples and performs another action (e.g., landing at a different location, coupling to another drone, etc.).

In an example, the lift drone 204 and the carrier drone 202 may liftoff together, travel together to a delivery location, and optionally, land together. The lift drone 204 and the carrier drone 202 may convey the payload 206, with one or the other drone carrying or supporting the drone system 200 at a given time. In an example, the drones may carry or support the drone system 200 together (e.g., both drones contributing to support the drone system 200 or the payload 206). For example, the lift drone 204 may supply lift to the drone system 200 until the drone system 200 reaches a specified altitude, and then control may change to the carrier drone 202 to be responsible for carrying or supporting the drone system 200 as the carrier drone 202 conveys the payload 206 or the drone system (e.g., with or without the lift drone 204) to a delivery location.

In an example where the lift drone 204, the carrier drone 202, and the payload 206 travel together, the carrier drone 202 may supply power to the drone system 200 as it traverses toward a delivery location. When changes in altitude are needed (e.g., due to obstructions, regulations, weather, etc.), the lift drone 204 may take over control of the drone system 200 to supply the change in altitude. This switching of control may occur whenever the drone system 200 includes the lift drone 204 and the carrier drone 202 coupled together or when both are coupled to the payload 206.

Figure 3:
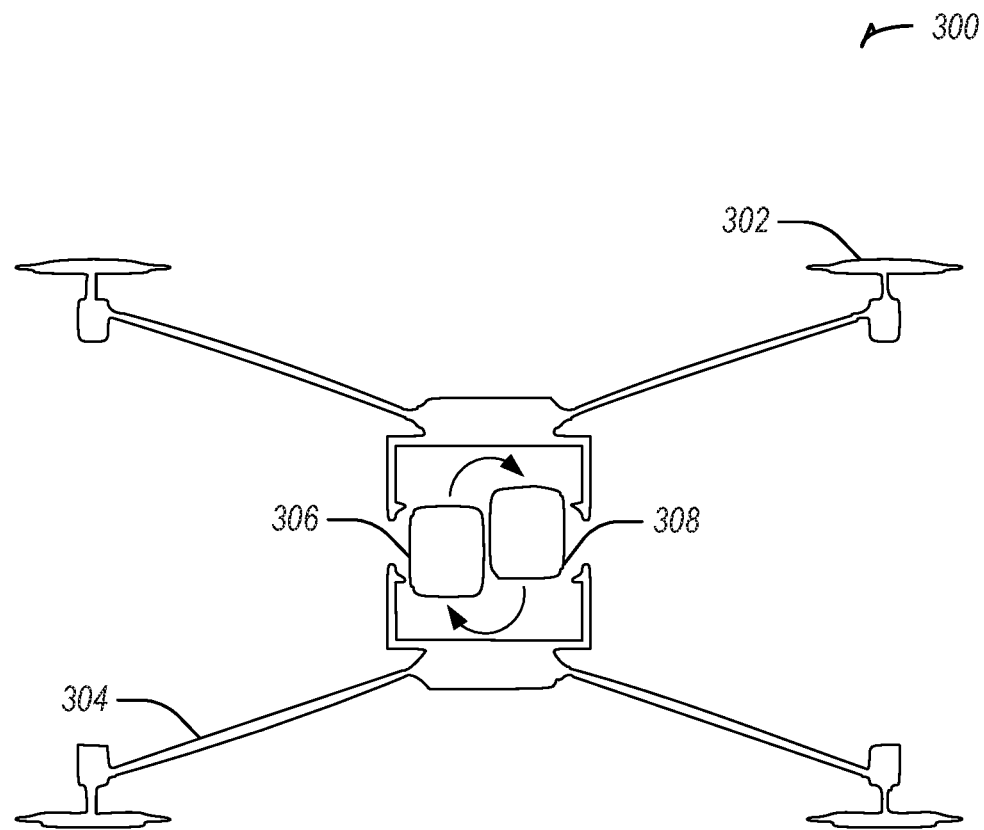

FIG. 3 illustrates a third example drone based delivery system 300. The system 300 includes a lift drone 304 and a carrier drone 302. The lift drone 304 may be the lift drone 204 of FIG. 2 or the lift drone 104 of FIG. 1 and the carrier drone 302 may be the carrier drone 202 of FIG. 2 or the carrier drone 102 of FIG. 1. The drone system 300 illustrates a payload transfer between the lift drone 304 and the carrier drone 302. The payload transfer may include transfer of a single payload item or may include a transfer of a first payload item 306 for a second payload item 308. In another example, a first payload item 306 may be transferred to the carrier drone 302 while a second payload item 308 is retained by the lift drone 304, for example to transfer to a second carrier drone. The lift drone 304 may lift both the payload items 306 and 308 together, and transfer each to a separate carrier drone.

Figure 4:
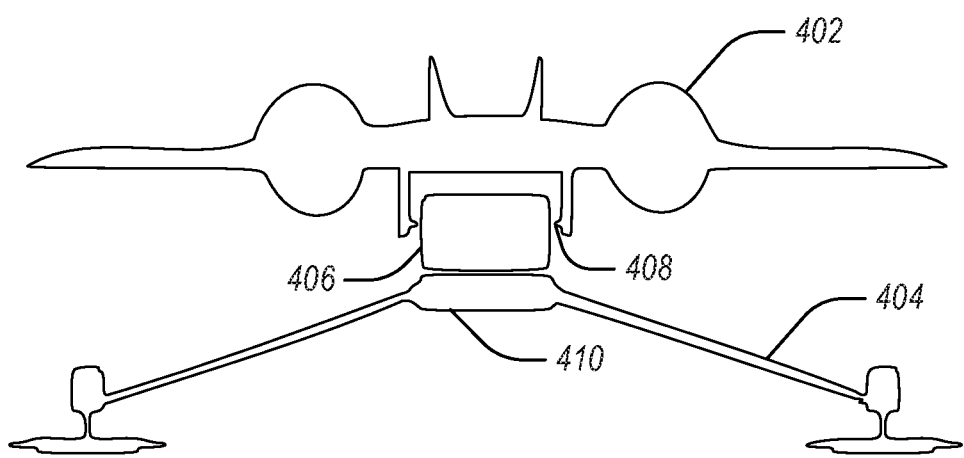

FIG. 4 illustrates a fourth example drone based delivery system 400. The system 400 includes a lift drone 404 and a carrier drone 402. In an example, the lift drone 404 may be lift drones 304, 204, or 104 of FIG. 3, 2, or 1 respectively. The carrier drone 402 shown in the drone system 400 is a fixed wing drone. In an example, the multi-rotor flit drone 404 may be used to lift a payload 406 from an initial position and rendezvous with the fixed wing carrier drone 402. In this example, the fixed wing carrier drone 402 may take off from a remote location and rendezvous with the lift drone 404 in air, for example by matching transverse speed with the lift drone 404 and receiving the payload 406. The lift drone 404 may return to the initial position after transferring the payload 406 or may couple to the fixed wing carrier drone 402 (or remain coupled to the payload 406), while allowing the fixed wing carrier drone 402 to take control of the drone system 400. The fixed wing carrier drone 402 may convey the drone system 400 to a delivery location, at which point the lift drone 404 may land the drone system 400, a second lift drone may land the drone system 400, or the fixed wing carrier drone 402 may land with the payload 406 (e.g., using a runway). The payload may be secured to the fixed wing carrier drone 402 using a latch 408, similar to the latch 108 described above in FIG. 1. The lift drone 404 may include a platform 410 or may include a latch, or both.

In another example, the lift drone 404 may lift the payload 406 and the fixed wing carrier drone 402 together from an initial position to a transfer location. At the transfer location, control of the drone system 400 may be transferred to the fixed wing carrier drone 402, which may convey the payload 406 to a delivery location. In one example, the lift drone 404 may disengage from the payload 406 or the fixed wing carrier drone 402. In this example, the fixed wing carrier drone 402 may rendezvous with a second lift drone at the delivery location to land with the payload 406 or transfer the payload 406 for landing (and the fixed wing carrier drone 402 may land elsewhere). In a second example, the fixed wing carrier drone 402 may carry the lift drone 404 to the delivery location, which may take over control of the drone system 400 at the delivery location to land the payload 406 (and optionally the fixed wing carrier drone 402, or the fixed wing carrier drone 402 may disengage and land remotely or continue on to other actions such as a second delivery).

Figure 5:
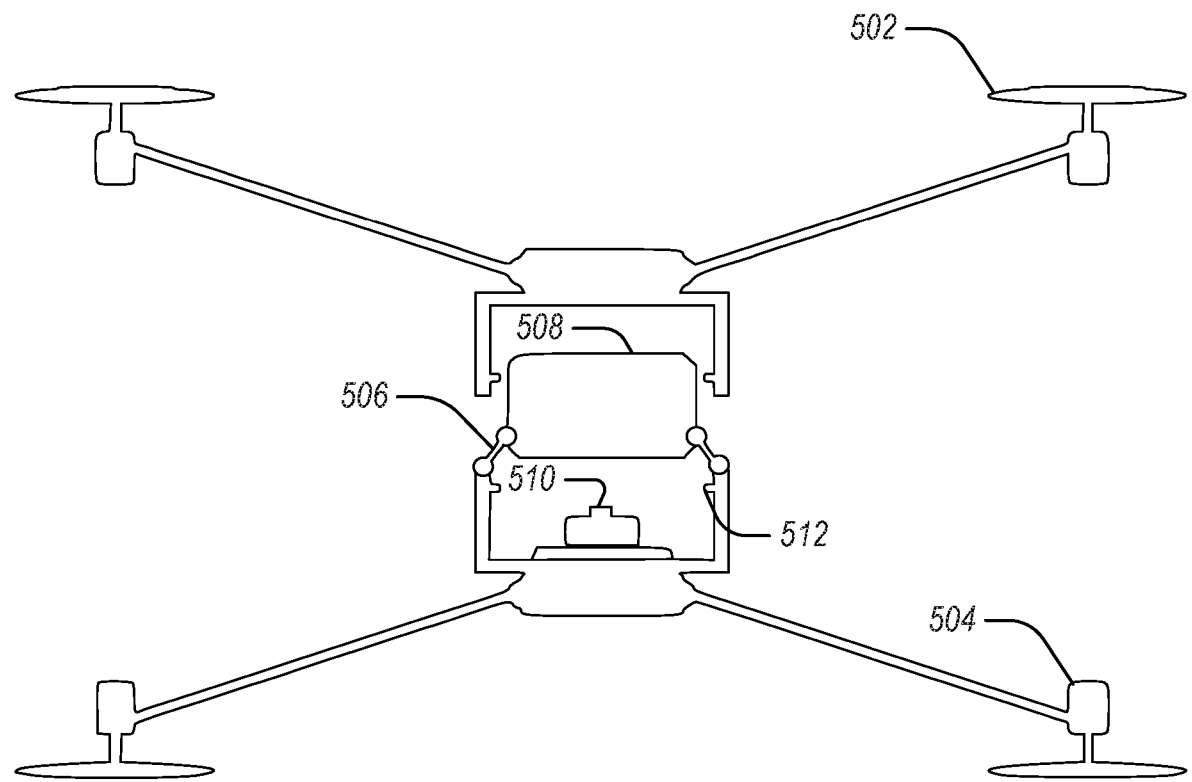

FIG. 5 illustrates a fifth example drone based delivery system 500. The system 500 includes a lift drone 504 and a carrier drone 502. The lift drone 504 may include a latch 512 or a payload alignment feeler 506 or both. In an example, the lift drone 504 may include a plurality of latches or payload alignment feelers, such as a pair of latches or payload alignment feelers opposite each other to align or latch a payload 508, or four latches or payload alignment feelers (e.g., one on each side of the payload 508 when the payload 508 is a box). In an example, the carrier drone 502 may include a latch or latches or a payload alignment feeler or payload alignment feelers. In an example, the lift drone 504 may have latches that may be remotely retracted to release the payload 508 or remotely extended to latch onto the payload 508. In an example, the latch 512 may include a retractable latch specially configured to couple with the payload 508. For example, the payload 508 may include receiving slots configured to receive the latch 512. In an example, the latch 512 may be magnetic and may retract automatically via controller.

The lift drone 504, the carrier drone 502, or both may include a camera, such as monocular camera 510 of the lift drone 504. For rendezvous between the lift drone 504 and the carrier drone 502, a computer vision system may be used. The computer vision system may be installed on the lift drone 504, the carrier drone 502, or both. The computer vision system may be installed in the lift drone 504 or the carrier drone 502, and may control that drone. In an example, the computer vision system may remotely control the other drone of the lift drone 504 or the carrier drone 502. In another example a computer vision system may be installed on both drones, and the computer vision systems of the two drones may communicate with each other to perform a rendezvous or transfer. For example, a monocular camera may be used to guide one of the drones 502 or 504 towards a marking on the payload 508. For example, the monocular camera 510 may take images of the payload 508 as the lift drone 504 approaches the carrier drone 502 when the carrier drone 502 controls the payload 508. Based on the images, the computer vision system of the lift drone 504 may control the lift drone 504 to couple with the payload 508 or the carrier drone 502.

To rendezvous, a first drone may use one or more techniques including localization (e.g., via GPS) or a technique based on sensor to give a first order approximation of where a second drone is located such that the first drone may move to generally the same area as the second drone. More refined alignment may be performed using the monocular camera 510, the payload alignment feeler 506, or other sensors. For example, the payload 508 may have a special mark or be a special container, that includes an additional marker or wireless beacon. Using the mark or beacon, the first drone may precisely align with the payload. For example, the first drone may use the monocular camera 510 to locate the payload 508, then track the payload 508 using the camera, and use fine movement control of the first drone to align with the payload. In another example, a magnetic guide on the payload container or a wireless beacon may be used to align the first drone automatically. The magnetic guide may cause a magnetic field that draws the first drone to the payload 508 automatically.

In an example, when the lift drone 504 is carrying the payload 508, the carrier drone 502 may use a camera to communicate instructions to the lift drone 504. For example images taken by the camera of the carrier drone 502 may be used to determine needed fine adjustments, and the lift drone 504 may perform movements to complete the rendezvous. The camera of the carrier drone 502 may be a wireless camera mounted on the carrier drone 502 to give information back to the lift drone 504.

In an example the payload alignment feeler 506 may include a contact force sensor or a strain sensor to give force feedback information to the lift drone 504 for fine adjustment to align with the payload 508 or the carrier drone 502. The lift drone 504 may use the payload alignment feeler 506 to align with the payload 508 or the carrier drone 502 by equalizing forces or strains detected by the payload alignment feeler 506 with a second payload alignment feeler on an opposite side of the payload 508. The payload alignment feeler 508 may output an electrical signal based on force. In another example, the lift drone 504 may fine-tune its position relative to the payload 508 or the carrier drone 502 based on two or more payload alignment feelers (e.g., four feelers, one on each side of a box payload) by equalizing force feedback.

Figure 6A:
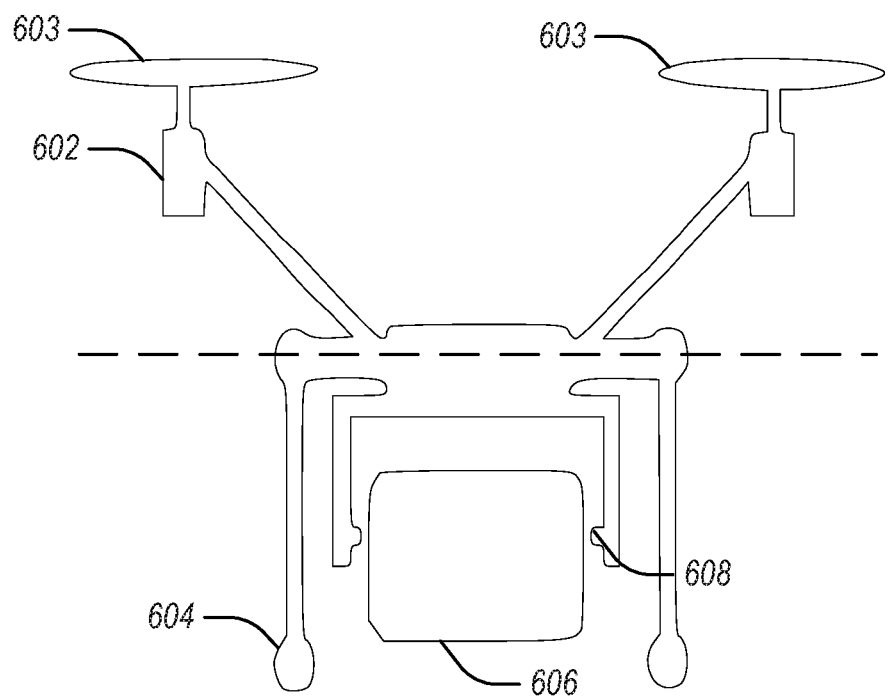
FIGS. 6A-6B illustrate two configurations for a drone in accordance with some embodiments.
Figure 6B:
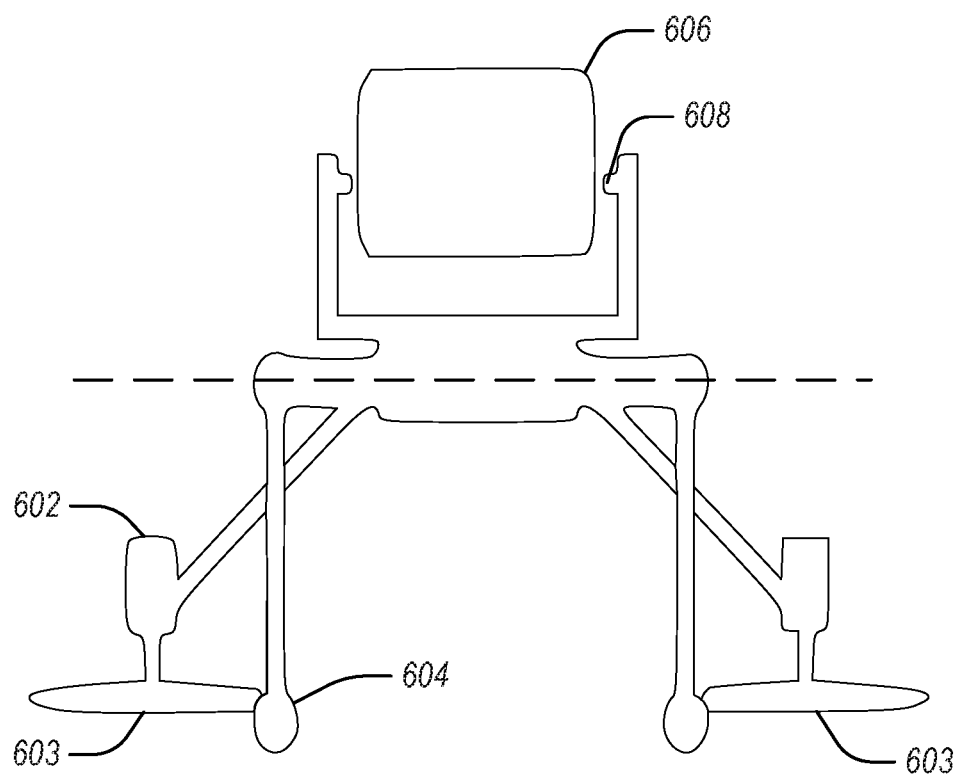

FIGS. 6A-6B illustrate two configurations for a drone 602 in accordance with some embodiments. The drone 602 includes stabilizers or landing gear 604, and a latch 608 to secure a payload 606. FIG. 6A illustrates the drone 602 with the stabilizers or landing gear 604 opposite rotors 603 (e.g., across an plane 610 of a body of the drone 602) and on the same side as the payload 606. FIG. 6B illustrates the drone 602 with the stabilizers or landing gear 604 aligned with the rotors 603 (e.g., on the same side of the plane 610) with the payload 606 opposite the stabilizers or landing gear 604 and the rotors 603. The drone 602 includes the two configurations shown in FIGS. 6A and 6B. The configurations may be switched between when the drone 602 is not operating.

In an example, the drone 602 may be configured to act as a carrier drone or a lift drone. For example, when in the configuration shown in FIG. 6A, the drone may act as a carrier drone, and when in the configuration shown in FIG.

6B, the drone may act as a lift drone. A first drone configured like the drone in FIG. 602A may rendezvous with a second drone configured like the drone 602 in FIG. 6B to act as a drone system as described herein above. In an example, a flight controller that controls the drone 602 in both upright and upside down configurations may be used. The controller may also handle unbalanced or switching payloads (e.g., drone flight without a payload and with a payload). Further, the controller for one of a lift drone and carrier drone in a drone system may act as a master controller and the other as a slave. The master/slave relationship may switch depending on whether the drone system is performing a lift or conveying a payload.

Figure 7A:
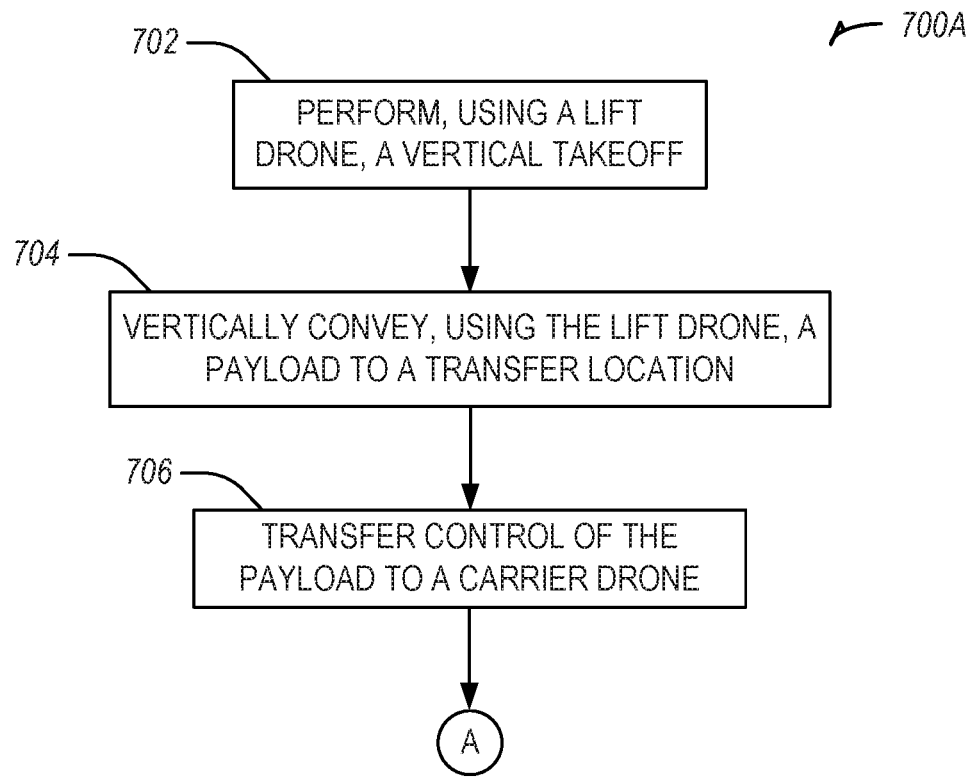
FIGS. 7A-7B illustrate flowcharts showing techniques for using a drone based delivery system in accordance with some embodiments.
Figure 7B:
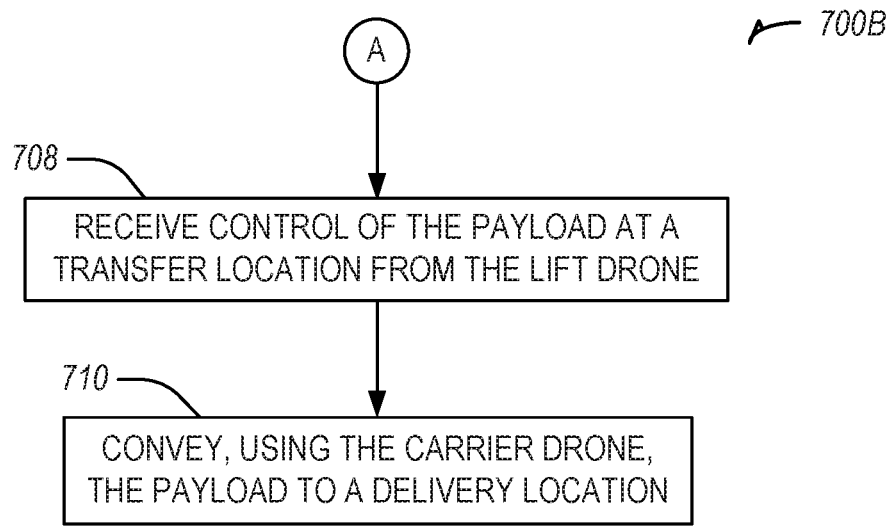

FIGS. 7A-7B illustrate flowcharts showing techniques 700A-700B for using a drone based delivery system in accordance with some embodiments. Techniques 700A-700B are shown in separate figures, although they may be performed together. The technique 700A is performed using a lift drone, and the technique 700B is performed using a carrier drone. In an example, the techniques 700A-700B may be performed in reverse, individually or including operations 710-702. In other examples, some operations of the techniques 700A-700B may be performed together and other operations omitted.

The technique 700A includes an operation 702 to perform, using a lift drone, a vertical takeoff. The operation 702 may include performing a vertical takeoff from an initial position, the takeoff being counter to a gravitational force. The technique 700A includes an operation 704 to vertically convey, using the lift drone, a payload to a transfer location. In an example, the transfer location has an altitude greater than the initial location.

The technique 700A includes an operation 706 to transfer control of the payload to a carrier drone. The operation 706 may include transferring control of the payload to the carrier drone, the payload to be conveyed to a remote location. The operation 706 may include coupling with the carrier drone. Coupling with the carrier drone may include coupling with the payload controlled or coupled to the carrier drone or otherwise forming a drone system with the carrier drone. For example, coupling with the carrier drone may include transferring control of the payload to the carrier drone. In an example, the lift drone may shut down at least one function of the lift drone when coupled to the carrier drone, the at least one function including shutting down a rotor or all rotors, a controller, a camera, etc. In an example, coupling with the carrier drone may include receiving a control signal from the carrier drone, the control signal to cause an operation of the lift drone to occur. The examples described above may be combined, for example to shut down the controller of the lift drone or turn the controller of the lift drone into a slave of the controller of the carrier drone, and receive a control signal from the master controller of the carrier drone.

In an example, the operation 706 may include transferring control of the payload to the carrier drone while the lift drone remains coupled to the payload and the carrier drone couples to the payload. In another example, the operation 706 may include physically transferring the payload to the carrier drone and disengaging from the payload. In yet another example, the operation 706 may include using information received from a camera of the carrier drone to perform a fine adjustment at the lift drone to align the payload to the carrier drone. In still another example, the operation 706 may include using information from a camera of the lift drone to perform a fine adjustment at the lift drone to align the payload to the lift drone. The camera may be a monocular camera and the payload may include a special marking, as described above. In an example, a fine adjustment may be an adjustment within a few degrees (e.g., 5 for a turn) or at a low speed (e.g., 10% of maximum speed of the drone).

In an example, the lift drone and the carrier drone are interchangeable. In another example, the lift drone is a multi-rotor drone and the carrier drone is a fixed-wing drone. The technique 700A may include using retractable latches of the lift drone to secure the payload to the lift drone.

The technique 700A may end at "A" in FIG. 7A where the transfer of the payload has occurred or is initiated from the lift drone to the carrier drone. The technique 700B may start at "A" after transfer has occurred or is initiated to the carrier drone from the lift drone.

The technique 700B includes an operation 708 to receive control of the payload at a transfer location from the lift drone. The operation 708 may include coupling, at the carrier drone, to the lift drone. In an example, the operation 708 includes sending a control signal to the lift drone to cause an operation of the lift drone to occur. The operation may cause the lift drone to align with the carrier drone or separate from the carrier drone.

In an example, receiving control of the payload includes activating a payload alignment feeler of the carrier drone to align the payload. The payload alignment feeler may be a contact force switch. The carrier drone may use information from the contact force switch to perform a fine adjustment to align with the payload, for example, balancing forces on the contact force switch with another contact force switch on an opposite side of the payload from the contact force switch. In an example, receiving control of the payload includes using a monocular camera to identify a marking on the payload. The information may be sent from the monocular camera about the marking to the lift drone, which may use the information to perform a fine adjustment to align with the payload. In another example, the carrier drone may use the information from the monocular camera to align with the payload.

The technique 700B includes an operation 710 to convey, using the carrier drone, the payload to a delivery location. The operation 710 may include conveying the lift drone to the delivery location with the payload. The carrier drone may be a fixed-wing drone and the lift drone may be a multi-rotor drone. In an example, the lift drone and the carrier drone are interchangeable. In an example, the technique 700B includes using retractable latches of the carrier drone to secure the payload to the carrier drone. The technique 700B may include landing, using the carrier drone, with the payload after reaching the delivery location. In an example, the technique 700B includes transferring control of the payload from the carrier drone to another drone to further convey the payload. In an example, the operation 710 includes decoupling from the lift drone to allow the lift drone to land with the payload after reaching the delivery location.

Figure 8:
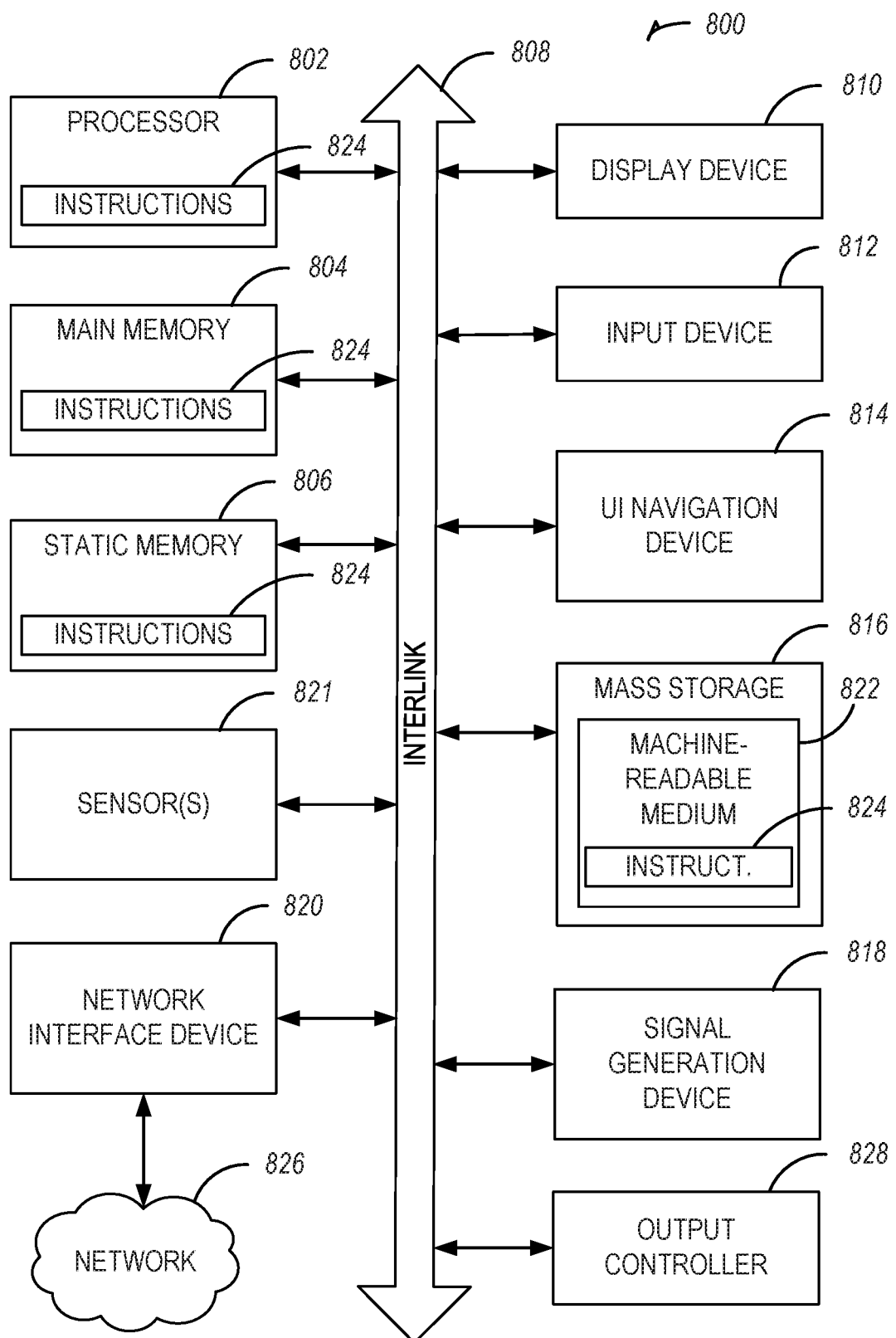
FIG. 8 illustrates generally an example of a block diagram of a machine upon which any one or more of the techniques discussed herein may perform in accordance with some embodiments.

FIG. 8 illustrates generally an example of a block diagram of a machine 800 upon which any one or more of the techniques (e.g., methodologies) discussed herein may perform in accordance with some embodiments. In alternative embodiments, the machine 800 may operate as a standalone device or may be connected (e.g., networked) to other machines. Portions or all of the machine may be incorporated into a drone, such as drone 102, 104, 202, 204, 302, 304, 402, 404, 502, 504, or 602. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a drone computing device, a control system, an IMU, a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, alphanumeric input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 that is non-transitory on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Figure 9:
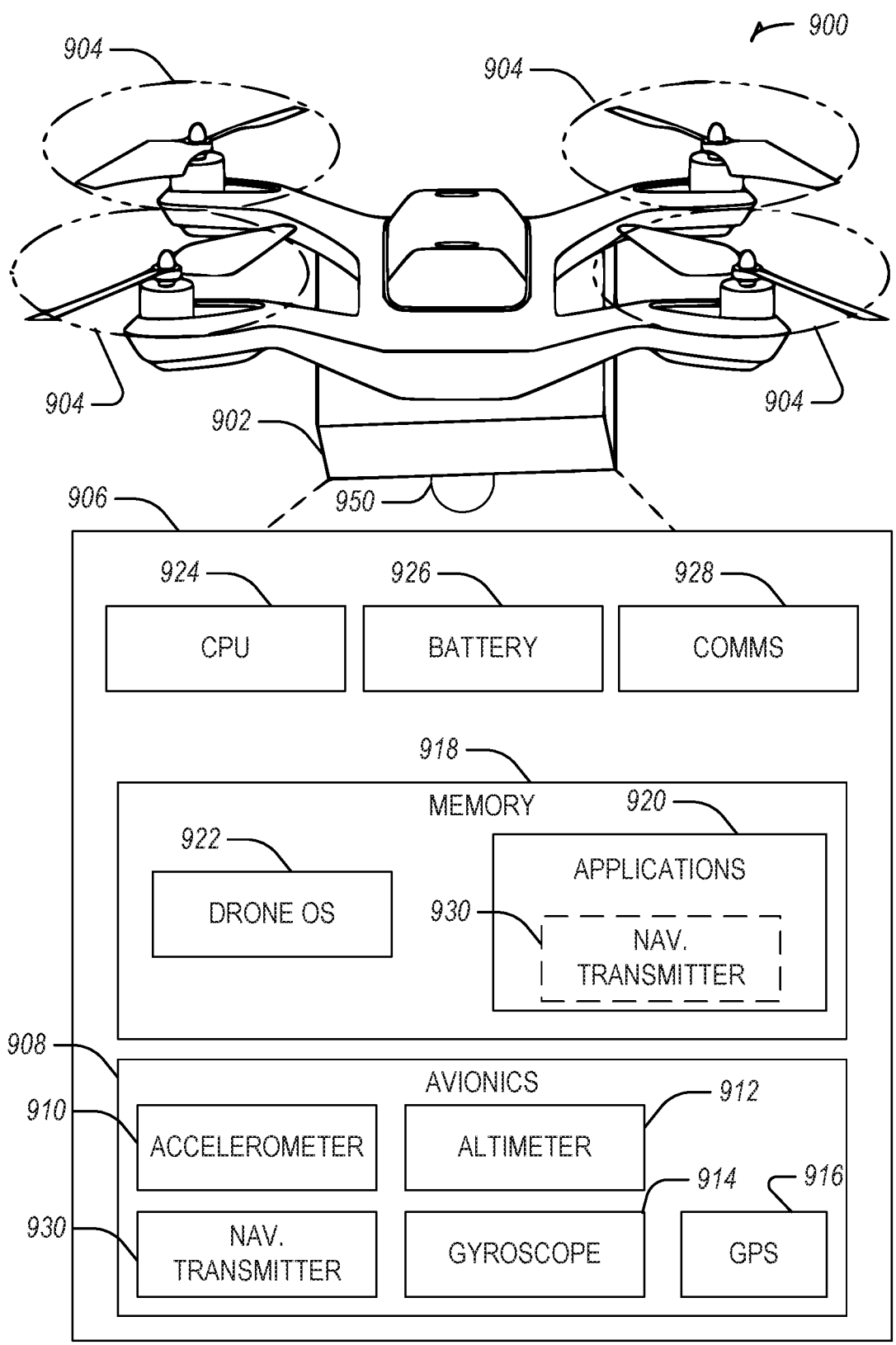
FIG. 9 shows an example schematic of a drone in accordance with some embodiments.

FIG. 9 shows an example schematic of a drone 900 in accordance with some embodiments. As shown in FIG. 9, the drone 900 may include an airframe 902, a flight mechanism 904, and computing environment 906. The airframe 902 may be made of made of polymers, metals, etc. and the other components of the drone 900 may be secured to the airframe 902.

The flight mechanism 904 may include mechanisms that may propel the drone 900 through the air. For example, the flight mechanism 904 may include propellers, rotors, turbofans, turboprops, etc. The flight mechanism 904 may operably interface with avionics 908. The avionics 908 may be part of the computing environment 906 (as shown in FIG. 9) or standalone components. For example, the avionics 908 may include accelerometers 910, an altimeter 912, gyroscopes 914, or a GPS receiver 916.

The various components of the avionics 908 may be standalone components or may be part of an autopilot system or other avionics package. For example, the altimeter 912 and GPS receiver 916 may be part of an autopilot system that includes one or more axes of control. For instance, the autopilot system may be a two-axis autopilot that may maintain a preset course and hold a preset altitude. The avionics 908 may be used to control in-flight orientation of the drone 900. For example, the avionics 908 may be used to control orientation of the drone 900 about pitch, bank, and yaw axes while in flight.

The avionics 908 may allow for autonomous flight. For example, as described herein, the drone 900 may receive a flightpath that the drone 900 may fly without further user input. In addition, the avionics 908 may include a navigation transmitter 930 that may be used to transmit commands to the flight mechanism 904. While FIG. 9 shows the navigation transmitter 930 as part of the avionics 908, the navigation transmitter 930 may be software stored in a memory 918 as shown by dashed navigation transmitter 930.

The computing environment 906 may also include the memory 918 that may store applications 920 and a drone operating system (OS) 922. The applications 920 may include lighting controls for controlling one or more LEDs 950. The applications 920 may include a communications program that may allow drone 900 to communicate with a computing device. In addition, the applications 920 may include software that functions as the navigation transmitter 930.

The memory 918 may provide a secure area for storage of components used to authenticate communications between the drone 900 and the computing device. For example, the memory 918 may store SSL certificates or other security tokens. The data stored in the memory 918 may be read-only data such that during operation the data cannot be corrupted or otherwise altered by malware, viruses, or by other users that may try and take control of the drone 900.

The computing environment 906 may include a central processing unit (CPU) 924, a battery 926, and a communications interface 928. The CPU 924 may be used to execute operations and method steps, such as those described herein with regard to FIG. 7. The memory 918 also may store data received by the drone 900 as well as programs and other software utilized by the drone 900. For example, the memory 918 may store instructions that, when executed by the CPU 924, cause the CPU 924 to perform operations such as those described herein.

The communications interface 928 may include transmitters, receivers, or transceivers that may be used to communicate with the computing device. In addition, the communications interface 928 may include a cellular interface or other wireless credential exchange circuitry. For example, the communications interface 928 may allow the drone 900 to transmit its position to the computing device and also allow the drone 900 to receive the flightpaths and other data from the computing device. While FIG. 9 shows various components of the drone 900, not all components shown in FIG. 9 are required. For example, drone 900 may not have the gyroscopes 914, the altimeter 914, etc.

Various Notes & Examples

Each of these non-limiting examples may stand on its own, or may be combined in various permutations or combinations with one or more of the other examples.

Example 1 is a drone based delivery system comprising: a lift drone to: perform a vertical takeoff from an initial position counter to a gravitational force; vertically convey a payload to a transfer location, the transfer location having an altitude greater than the initial location; and transfer control of the payload to a carrier drone to be conveyed to a remote location.

In Example 2, the subject matter of Example 1 includes, wherein to transfer control of the payload, the lift drone is further to couple with the carrier drone.

In Example 3, the subject matter of Example 2 includes, wherein to couple with the carrier drone, the lift drone is to transfer control of the payload to the carrier drone and shut down at least one function of the lift drone.

In Example 4, the subject matter of Examples 2-3 includes, wherein to couple with the carrier drone, the lift drone is to transfer control of the payload to the carrier drone and receive a control signal from the carrier drone, the control signal to cause an operation of the lift drone to occur.

In Example 5, the subject matter of Examples 1-4 includes, wherein to transfer control of the payload to the carrier drone, the lift drone is further to remain coupled to the payload while the carrier drone couples to the payload.

In Example 6, the subject matter of Examples 1-5 includes, wherein to transfer control of the payload, the lift drone is further to physically transfer the payload to the carrier drone and disengage from the payload.

In Example 7, the subject matter of Examples 1-6 includes, wherein to vertically convey the payload, the lift drone is to vertically convey the carrier drone from the initial position to the transfer location.

In Example 8, the subject matter of Examples 1-7 includes, wherein the lift drone and the carrier drone are interchangeable.

In Example 9, the subject matter of Examples 1-8 includes, wherein the lift drone is a multi-rotor drone.

In Example 10, the subject matter of Examples 1-9 includes, wherein the lift drone is further to use retractable latches to secure the payload to the lift drone.

In Example 11, the subject matter of Examples 1-10 includes, wherein to transfer control of the payload to the carrier drone, the lift drone is further to use information received from a camera of the carrier drone to perform a fine adjustment to align the payload to the carrier drone.

In Example 12, the subject matter of Examples 1-11 includes, wherein the carrier drone is a fixed-wing drone.

In Example 13, the subject matter of Examples 1-12 includes, wherein the carrier drone is a multi-rotor drone.

Example 14 is a drone based delivery system comprising: a carrier drone to: receive control of a payload at a transfer location from a lift drone, the transfer location having an altitude greater than a takeoff location of the lift drone; and in response to receiving control of the payload from the lift drone, convey the payload to a delivery location.

In Example 15, the subject matter of Example 14 includes, wherein to convey the payload to the delivery location, the carrier drone is to convey the lift drone to the delivery location with the payload.

In Example 16, the subject matter of Examples 14-15 includes, wherein the carrier drone is a fixed-wing drone.

In Example 17, the subject matter of Examples 14-16 includes, wherein to receive control of the payload, the carrier drone is further to couple with the lift drone.

In Example 18, the subject matter of Example 17 includes, wherein to receive control of the payload, the carrier drone is further to send a control signal to the lift drone to cause an operation of the lift drone to occur, the operation to cause the lift drone to align with the carrier drone.

In Example 19, the subject matter of Examples 17-18 includes, wherein the carrier drone is further to decouple from the lift drone to allow the lift drone to land with the payload after reaching the delivery location.

In Example 20, the subject matter of Examples 14-19 includes, wherein to receive control of the payload, the carrier drone is further to activate a payload alignment feeler of the carrier drone to align the payload.

In Example 21, the subject matter of Example 20 includes, wherein the payload alignment feeler is a contact force switch and wherein the carrier drone is further to use information from the contact force switch to perform a fine adjustment to align with the payload.

In Example 22, the subject matter of Examples 20-21 includes, wherein to receive control of the payload, the carrier drone is further to use a monocular camera to identify a marking on the payload, and send information from the monocular camera about the marking to the lift drone, the information to allow the lift drone to perform a fine adjustment to align with the payload.

In Example 23, the subject matter of Examples 14-22 includes, wherein the lift drone and the carrier drone are interchangeable.

In Example 24, the subject matter of Examples 14-23 includes, wherein the carrier drone is further to use retractable latches to secure the payload to the carrier drone.

In Example 25, the subject matter of Examples 14-24 includes, wherein the carrier drone is further to land with the payload after reaching the delivery location.

In Example 26, the subject matter of Examples 14-25 includes, wherein the carrier drone is further to transfer control of the payload to another drone to further convey the payload.

In Example 27, the subject matter of Examples 14-26 includes, wherein the carrier drone is a fixed-wing drone.

In Example 28, the subject matter of Examples 14-27 includes, wherein the carrier drone is a multi-rotor drone.

Example 29 is a method for controlling a lift drone of a drone based delivery system, the method comprising: performing, using the lift drone, a vertical takeoff from an initial position counter to a gravitational force; vertically conveying, using the lift drone, a payload to a transfer location, the transfer location having an altitude greater than the initial location; and transferring, using the lift drone, control of the payload to a carrier drone to be conveyed to a remote location.

In Example 30, the subject matter of Example 29 includes, wherein transferring control of the payload includes coupling with the carrier drone.

In Example 31, the subject matter of Example 30 includes, wherein coupling with the carrier drone includes transferring control of the payload to the carrier drone and shutting down at least one function of the lift drone.

In Example 32, the subject matter of Examples 30-31 includes, wherein coupling with the carrier drone includes transferring control of the payload to the carrier drone and receiving a control signal from the carrier drone, the control signal to cause an operation of the lift drone to occur.

In Example 33, the subject matter of Examples 29-32 includes, wherein transferring control of the payload to the carrier drone includes remaining coupled to the payload while the carrier drone couples to the payload.

In Example 34, the subject matter of Examples 29-33 includes, wherein transferring control of the payload includes physically transferring the payload to the carrier drone and disengage from the payload.

In Example 35, the subject matter of Examples 29-34 includes, wherein vertically conveying the payload includes vertically conveying the carrier drone from the initial position to the transfer location.

In Example 36, the subject matter of Examples 29-35 includes, wherein the lift drone and the carrier drone are interchangeable.

In Example 37, the subject matter of Examples 29-36 includes, wherein the lift drone is a multi-rotor drone and the carrier drone is a fixed-wing drone.

In Example 38, the subject matter of Examples 29-37 includes, using retractable latches of the lift drone to secure the payload to the lift drone.

In Example 39, the subject matter of Examples 29-38 includes, wherein transferring control of the payload to the carrier drone includes using information received from a camera of the carrier drone to perform a fine adjustment to align the payload to the carrier drone.

Example 40 is at least one machine-readable medium including instructions for operation of a computing system, which when executed by a machine, cause the machine to perform operations of any of the methods of Examples 29-39.

Example 41 is an apparatus comprising means for performing any of the methods of Examples 29-39.

Example 42 is a method for controlling a carrier drone of a drone based delivery system, the method comprising: receiving control, at the carrier drone, of a payload at a transfer location from a lift drone, the transfer location having an altitude greater than a takeoff location of the lift drone; and in response to receiving control of the payload from the lift drone, conveying, using the carrier drone, the payload to a delivery location.

In Example 43, the subject matter of Example 42 includes, wherein conveying the payload to the delivery location includes conveying the lift drone to the delivery location with the payload.

In Example 44, the subject matter of Examples 42-43 includes, wherein the carrier drone is a fixed-wing drone and the lift drone is a multi-rotor drone.

In Example 45, the subject matter of Examples 42-44 includes, wherein receiving control of the payload includes coupling, at the carrier drone, to the lift drone.

In Example 46, the subject matter of Example 45 includes, wherein receiving control of the payload includes sending a control signal to the lift drone to cause an operation of the lift drone to occur, the operation to cause the lift drone to align with the carrier drone.

In Example 47, the subject matter of Examples 45-46 includes, decoupling from the lift drone to allow the lift drone to land with the payload after reaching the delivery location.

In Example 48, the subject matter of Examples 42-47 includes, wherein receiving control of the payload includes activating a payload alignment feeler of the carrier drone to align the payload.

In Example 49, the subject matter of Example 48 includes, wherein the payload alignment feeler is a contact force switch and further comprising using information from the contact force switch to perform a fine adjustment to align with the payload.

In Example 50, the subject matter of Examples 48-49 includes, wherein receiving control of the payload includes using a monocular camera to identify a marking on the payload, and sending information from the monocular camera about the marking to the lift drone, the information to allow the lift drone to perform a fine adjustment to align with the payload.

In Example 51, the subject matter of Examples 42-50 includes, wherein the lift drone and the carrier drone are interchangeable.

In Example 52, the subject matter of Examples 42-51 includes, using retractable latches of the carrier drone to secure the payload to the carrier drone.

In Example 53, the subject matter of Examples 42-52 includes, landing, using the carrier drone, with the payload after reaching the delivery location.

In Example 54, the subject matter of Examples 42-53 includes, transferring control of the payload from the carrier drone to another drone to further convey the payload.

Example 55 is at least one machine-readable medium including instructions for operation of a computing system, which when executed by a machine, cause the machine to perform operations of any of the methods of Examples 42-54.

Example 56 is an apparatus comprising means for performing any of the methods of Examples 42-54.

Example 57 is at least one machine-readable medium including instructions for controlling a lift drone of a drone based delivery system, which when executed by the lift drone, cause the lift drone to: perform a vertical takeoff from an initial position counter to a gravitational force; vertically convey a payload to a transfer location, the transfer location having an altitude greater than the initial location; and transfer control of the payload to a carrier drone to be conveyed to a remote location.

In Example 58, the subject matter of Example 57 includes, wherein to transfer control of the payload, the instructions are further to cause the lift drone to couple with the carrier drone.

In Example 59, the subject matter of Example 58 includes, wherein to couple with the carrier drone, the instructions are further to cause the lift drone to transfer control of the payload to the carrier drone and shut down at least one function of the lift drone.

In Example 60, the subject matter of Examples 58-59 includes, wherein to couple with the carrier drone, the instructions are further to cause the lift drone to transfer control of the payload to the carrier drone and receive a control signal from the carrier drone, the control signal to cause an operation of the lift drone to occur.

In Example 61, the subject matter of Examples 57-60 includes, wherein to transfer control of the payload to the carrier drone, the instructions are further to cause the lift drone to remain coupled to the payload while the carrier drone couples to the payload.

In Example 62, the subject matter of Examples 57-61 includes, wherein to transfer control of the payload, the instructions are further to cause the lift drone to physically transfer the payload to the carrier drone and disengage from the payload.

In Example 63, the subject matter of Examples 57-62 includes, wherein to vertically convey the payload, the instructions are further to cause the lift drone to vertically convey the carrier drone from the initial position to the transfer location.

In Example 64, the subject matter of Examples 57-63 includes, wherein the lift drone and the carrier drone are interchangeable.

In Example 65, the subject matter of Examples 57-64 includes, wherein the lift drone is a multi-rotor drone and the carrier drone is a fixed-wing drone.

In Example 66, the subject matter of Examples 57-65 includes, wherein the instructions are further to cause the lift drone to use retractable latches to secure the payload to the lift drone.

In Example 67, the subject matter of Examples 57-66 includes, wherein to transfer control of the payload to the carrier drone, the instructions are further to cause the lift drone to use information received from a camera of the carrier drone to perform a fine adjustment to align the payload to the carrier drone.

Example 68 is at least one machine-readable medium including instructions for controlling a carrier drone of a drone based delivery system, which when executed by the carrier drone, cause the carrier drone to: receive control of a payload at a transfer location from a lift drone, the transfer location having an altitude greater than a takeoff location of the lift drone; and in response to receiving control of the payload from the lift drone, convey the payload to a delivery location.

In Example 69, the subject matter of Example 68 includes, wherein to convey the payload to the delivery location, the instructions are further to cause the carrier drone to convey the lift drone to the delivery location with the payload.

In Example 70, the subject matter of Examples 68-69 includes, wherein the carrier drone is a fixed-wing drone and the lift drone is a multi-rotor drone.

In Example 71, the subject matter of Examples 68-70 includes, wherein to receive control of the payload, the instructions are further to cause the carrier drone to couple with the lift drone.

In Example 72, the subject matter of Example 71 includes, wherein to receive control of the payload, the instructions are further to cause the carrier drone to send a control signal to the lift drone to cause an operation of the lift drone to occur, the operation to cause the lift drone to align with the carrier drone.

In Example 73, the subject matter of Examples 71-72 includes, wherein the instructions are further to cause the carrier drone to decouple from the lift drone to allow the lift drone to land with the payload after reaching the delivery location.

In Example 74, the subject matter of Examples 68-73 includes, wherein to receive control of the payload, the instructions are further to cause the carrier drone to activate a payload alignment feeler of the carrier drone to align the payload.

In Example 75, the subject matter of Example 74 includes, wherein the payload alignment feeler is a contact force switch and wherein the instructions are further to cause the carrier drone to use information from the contact force switch to perform a fine adjustment to align with the payload.

In Example 76, the subject matter of Examples 74-75 includes, wherein to receive control of the payload, the instructions are further to cause the carrier drone to use a monocular camera to identify a marking on the payload, and send information from the monocular camera about the marking to the lift drone, the information to allow the lift drone to perform a fine adjustment to align with the payload.

In Example 77, the subject matter of Examples 68-76 includes, wherein the lift drone and the carrier drone are interchangeable.

In Example 78, the subject matter of Examples 68-77 includes, wherein the instructions are further to cause the carrier drone to use retractable latches to secure the payload to the carrier drone.

In Example 79, the subject matter of Examples 68-78 includes, wherein the instructions are further to cause the carrier drone to land with the payload after reaching the delivery location.

In Example 80, the subject matter of Examples 68-79 includes, wherein the instructions are further to cause the carrier drone to transfer control of the payload to another drone to further convey the payload.

Example 81 is an apparatus for controlling a lift drone of a drone based delivery system, the apparatus comprising: means for performing, using the lift drone, a vertical takeoff from an initial position counter to a gravitational force; means for vertically conveying, using the lift drone, a payload to a transfer location, the transfer location having an altitude greater than the initial location; and means for transferring, using the lift drone, control of the payload to a carrier drone to be conveyed to a remote location.

In Example 82, the subject matter of Example 81 includes, wherein the means for transferring control of the payload include means for coupling with the carrier drone.

In Example 83, the subject matter of Example 82 includes, wherein the means for coupling with the carrier drone include means for transferring control of the payload to the carrier drone and means for shutting down at least one function of the lift drone.

In Example 84, the subject matter of Examples 82-83 includes, wherein the means for coupling with the carrier drone include means for transferring control of the payload to the carrier drone and means for receiving a control signal from the carrier drone, the control signal to cause an operation of the lift drone to occur.

In Example 85, the subject matter of Examples 81-84 includes, wherein the means for transferring control of the payload to the carrier drone include means for remaining coupled to the payload while the carrier drone couples to the payload.

In Example 86, the subject matter of Examples 81-85 includes, wherein the means for transferring control of the payload include means for physically transferring the payload to the carrier drone and disengage from the payload.

In Example 87, the subject matter of Examples 81-86 includes, wherein the means for vertically conveying the payload include means for vertically conveying the carrier drone from the initial position to the transfer location.

In Example 88, the subject matter of Examples 81-87 includes, wherein the lift drone and the carrier drone are interchangeable.

In Example 89, the subject matter of Examples 81-88 includes, wherein the lift drone is a multi-rotor drone and the carrier drone is a fixed-wing drone.

In Example 90, the subject matter of Examples 81-89 includes, means for using retractable latches of the lift drone to secure the payload to the lift drone.

In Example 91, the subject matter of Examples 81-90 includes, wherein the means for transferring control of the payload to the carrier drone include means for using information received from a camera of the carrier drone to perform a fine adjustment to align the payload to the carrier drone.

Example 92 is an apparatus for controlling a carrier drone of a drone based delivery system, the apparatus comprising: means for receiving control, at the carrier drone, of a payload at a transfer location from a lift drone, the transfer location having an altitude greater than a takeoff location of the lift drone; and in response to receiving control of the payload from the lift drone, means for conveying, using the carrier drone, the payload to a delivery location.

In Example 93, the subject matter of Example 92 includes, wherein the means for conveying the payload to the delivery location include means for conveying the lift drone to the delivery location with the payload.

In Example 94, the subject matter of Examples 92-93 includes, wherein the carrier drone is a fixed-wing drone and the lift drone is a multi-rotor drone.

In Example 95, the subject matter of Examples 92-94 includes, wherein the means for receiving control of the payload include means for coupling, at the carrier drone, to the lift drone.

In Example 96, the subject matter of Example 95 includes, wherein the means for receiving control of the payload include means for sending a control signal to the lift drone to cause an operation of the lift drone to occur, the operation to cause the lift drone to align with the carrier drone.

In Example 97, the subject matter of Examples 95-96 includes, means for decoupling from the lift drone to allow the lift drone to land with the payload after reaching the delivery location.

In Example 98, the subject matter of Examples 92-97 includes, wherein the means for receiving control of the payload include means for activating a payload alignment feeler of the carrier drone to align the payload.

In Example 99, the subject matter of Example 98 includes, wherein the payload alignment feeler is a contact force switch and further comprising means for using information from the contact force switch to perform a fine adjustment to align with the payload.

In Example 100, the subject matter of Examples 98-99 includes, wherein the means for receiving control of the payload include means for using a monocular camera to identify a marking on the payload, and means for sending information from the monocular camera about the marking to the lift drone, the information to allow the lift drone to perform a fine adjustment to align with the payload.

In Example 101, the subject matter of Examples 92-100 includes, wherein the lift drone and the carrier drone are interchangeable.

In Example 102, the subject matter of Examples 92-101 includes, means for using retractable latches of the carrier drone to secure the payload to the carrier drone.

In Example 103, the subject matter of Examples 92-102 includes, means for landing, using the carrier drone, with the payload after reaching the delivery location.

In Example 104, the subject matter of Examples 92-103 includes, means for transferring control of the payload from the carrier drone to another drone to further convey the payload.

Example 105 is at least one machine-readable medium including instructions that, when executed by processing circuitry, cause the processing circuitry to perform operations to implement of any of Examples 1-104.

Example 106 is an apparatus comprising means to implement of any of Examples 1-104.

Example 107 is a system to implement of any of Examples 1-104.

Example 108 is a method to implement of any of Examples 1-104.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A drone based delivery system comprising:
    a lift drone to:
        perform a vertical takeoff from an initial position counter to a gravitational force;
        vertically convey a payload to a transfer location, the transfer location having an altitude greater than the initial location;
        couple with a carrier drone; and
        transfer flight control to the carrier drone for conveyance of the payload to a remote location, wherein the lift drone remains coupled to the carrier drone for the conveyance of the payload to the remote location.

2. The drone based delivery system of claim 1, wherein to couple with the carrier drone, the lift drone is to transfer flight control to the carrier drone for the conveyance of the payload and shut down at least one function of the lift drone.

3. The drone based delivery system of claim 1, wherein to couple with the carrier drone, the lift drone is to transfer flight control to the carrier drone for the conveyance of the payload and receive a control signal from the carrier drone, the control signal to cause an operation of the lift drone to occur.

4. The drone based delivery system of claim 1, wherein to transfer flight control to the carrier drone for the conveyance of the payload, the lift drone is further to remain coupled to the payload while the carrier drone couples to the payload.

5. The drone based delivery system of claim 1, wherein to transfer flight control to the carrier drone for the conveyance of the payload, the lift drone is further to physically transfer the payload to the carrier drone and disengage from the payload.

6. The drone based delivery system of claim 1, wherein to vertically convey the payload, the lift drone is to vertically convey the carrier drone from the initial position to the transfer location.

7. The drone based delivery system of claim 1, wherein the lift drone and the carrier drone are interchangeable.

8. The drone based delivery system of claim 1, wherein the lift drone is further to decouple from the carrier drone to allow the lift drone to land with the payload after reaching the delivery location.

9. A drone based delivery system comprising:
    a carrier drone to:
        couple with a lift drone;
        receive, at a transfer location, flight control from the lift drone for conveyance of a payload to a delivery location, the transfer location having an altitude greater than a takeoff location of the lift drone; and
        in response to receiving flight control from the lift drone, convey the payload to the delivery location, wherein the lift drone remains coupled to the carrier drone for conveyance of the payload to the remote location.

10. The drone based delivery system of claim 9, wherein the carrier drone is a fixed-wing drone and the lift drone is a multi-rotor drone.

11. The drone based delivery system of claim 9, wherein to receive flight control from the lift drone for the conveyance of the payload, the carrier drone is further to send a control signal to the lift drone to cause an operation of the lift drone to occur, the operation to cause the lift drone to align with the carrier drone.

12. The drone based delivery system of claim 9, wherein the carrier drone is further to decouple from the lift drone to allow the lift drone to land with the payload after reaching the delivery location.

13. The drone based delivery system of claim 9, wherein to receive flight control from the lift drone for the conveyance of the payload, the carrier drone is further to activate a payload alignment feeler of the carrier drone to align the payload.

14. The drone based delivery system of claim 13, wherein the payload alignment feeler is a contact force switch and wherein the carrier drone is further to use information from the contact force switch to perform a fine adjustment to align with the payload.

15. The drone based delivery system of claim 13, wherein to receive flight control from the lift drone for the conveyance of the payload, the carrier drone is further to use a monocular camera to identify a marking on the payload, and send information from the monocular camera about the marking to the lift drone, the information to allow the lift drone to perform a fine adjustment to align with the payload.

16. The drone based delivery system of claim 9, wherein the lift drone and the carrier drone are interchangeable.

17. A method for controlling a lift drone of a drone based delivery system, the method comprising:
    performing, using the lift drone, a vertical takeoff from an initial position counter to a gravitational force;
    vertically conveying, using the lift drone, a payload to a transfer location, the transfer location having an altitude greater than the initial location;
    coupling with a carrier drone; and
    transferring, using the lift drone, flight control to the carrier drone for conveyance of the payload to a remote location, wherein the lift drone remains coupled to the carrier drone for the conveyance of the payload to the remote location.

18. The method of claim 17, further comprising using retractable latches of the lift drone to secure the payload to the lift drone.

19. The method of claim 17, wherein transferring flight control to the carrier drone for conveyance of the payload includes using information received from a camera of the carrier drone to perform a fine adjustment to align the payload to the carrier drone.

20. The method of claim 17, further comprising:
    receiving flight control from carrier drone;
    decoupling from the carrier drone; and
    vertically conveying, using the lift drone, the payload to the delivery location.

21. The method of claim 17, further comprising receiving a control signal from the carrier drone, the control signal causing an operation of the lift drone to occur.

22. At least one non-transitory machine-readable medium including instructions for controlling a carrier drone of a drone based delivery system, which when executed by the carrier drone, cause the carrier drone to:
    receive, at a transfer location, flight control from a lift drone for conveyance of a payload to a delivery location, the transfer location having an altitude greater than a takeoff location of the lift drone; and in response to receiving flight control from the lift drone, convey the payload to the delivery location, wherein the lift drone remains coupled to the carrier drone for the conveyance of the payload to the remote location.

23. The at least one non-transitory machine-readable medium of claim 22, wherein the instructions are further to cause the carrier drone to use retractable latches to secure the payload to the carrier drone.

24. The at least one non-transitory machine-readable medium of claim 22, wherein the instructions are further to cause the carrier drone to land with the payload after reaching the delivery location.

25. The at least one non-transitory machine-readable medium of claim 22, wherein the instructions are further to cause the carrier drone to transfer flight control to another drone to further convey the payload.

* * * * *